United States Patent [19]

Tsuchiyama et al.

[11] Patent Number: 4,898,230

[45] Date of Patent: Feb. 6, 1990

[54] AIR CONDITIONER WITH AN ENERGY SWITCH

[75] Inventors: Yuji Tsuchiyama; Masayuki Shimizu, both of Gunma, Japan

[73] Assignees: Sanyo Electric Co., Ltd., Osaka; Tokyo Sanyo Electric Co., Ltd., Gunma, both of Japan

[21] Appl. No.: 122,624

[22] Filed: Nov. 17, 1987

Related U.S. Application Data

[63] Continuation of Ser. No. 745,392, Jun. 14, 1985, abandoned.

[30] Foreign Application Priority Data

Jun. 18, 1984 [JP] Japan ................... 59-125537
Jun. 18, 1984 [JP] Japan ................... 59-125539
Jun. 18, 1984 [JP] Japan ................... 59-91017[U]

[51] Int. Cl.⁴ ........................................... F25B 29/00
[52] U.S. Cl. ........................................ 165/12; 165/26; 165/27; 165/29; 165/24; 236/51; 236/94; 364/557
[58] Field of Search ............... 236/51, 94; 165/12, 165/26, 27, 29, 24; 364/557

[56] References Cited

U.S. PATENT DOCUMENTS

| | | | |
|---|---|---|---|
| 4,071,745 | 1/1978 | Hall | 236/46 R |
| 4,077,566 | 3/1978 | Bradford | 236/51 |
| 4,264,034 | 4/1981 | Hyltin et al. | 236/46 R |
| 4,284,126 | 8/1981 | Dawson | 236/51 |
| 4,287,939 | 9/1981 | Pohl et al. | 236/51 |
| 4,289,272 | 9/1981 | Murase et al. | 165/268 |
| 4,308,911 | 1/1982 | Mandl | 165/26 |
| 4,316,577 | 2/1982 | Adams et al. | 236/46 R |
| 4,333,316 | 6/1982 | Stamp, Jr. et al. | 236/51 |
| 4,336,902 | 6/1982 | Neal | 236/51 |
| 4,341,345 | 7/1982 | Hammer et al. | 165/29 |
| 4,346,755 | 8/1982 | Alley et al. | 165/27 |
| 4,413,672 | 11/1983 | Sidebottom | 236/51 |
| 4,441,545 | 4/1984 | Alley et al. | 236/51 |
| 4,460,035 | 7/1984 | Mizote et al. | 165/12 |
| 4,661,914 | 4/1987 | Mulokey et al. | 364/557 |

FOREIGN PATENT DOCUMENTS

| | | | |
|---|---|---|---|
| 0073338 | 5/1982 | Japan | 236/51 |
| 0092639 | 6/1982 | Japan | 236/51 |

Primary Examiner—John Ford
Attorney, Agent, or Firm—Darby & Darby

[57] ABSTRACT

An air conditioner comprises a control portion and a refrigeration system wherein a compressor, a condenser, an expansion device and an evaporator are connected in a refrigerant flow relationship. The control portion compares the temperature measured by a room temperature sensor with the temperature set by a temperature setting switch. For heating, the compressor is stopped when the room temperature rises higher than the set temperature, and for cooling, the compressor is stopped when the room temperature falls lower than the set temperature. A special switch is installed in the control portion, and when this switch is operated, responsively the range of the temperature set by the temperature setting switch is changed. More specifically, when the switch is operated at heating the control portion lowers the upper limit of the temperature set by the temperature setting switch and at cooling, the lower limit of the temperature is heightened by the control portion. Thereby the capacity of heating or cooling of the air conditioner is reduced, therefore an over cooling at cooling and an over heating at heating can be prevented.

16 Claims, 6 Drawing Sheets

— HEATING
---- COOLING

| Ts | 16 | 17 | 18 | 19 | 20 | 21 | 22 | 23 | 24 | 25 | 26 | 27 |
|---|---|---|---|---|---|---|---|---|---|---|---|---|
| F(Ts) | 19 | 19 | 19 | 19 | 20 | 21 | 22 | 23 | 24 | 24 | 24 | 24 |

| Ts | 20 | 21 | 22 | 23 | 24 | 25 | 26 | 27 | 28 | 29 | 30 | 31 |
|---|---|---|---|---|---|---|---|---|---|---|---|---|
| G(Ts) | 23 | 23 | 23 | 23 | 24 | 25 | 26 | 27 | 28 | 28 | 28 | 28 |

AIR CONDITIONER WITH AN ENERGY SWITCH

This is a continuation of co-pending application Ser. No. 745,392 filed on June 14, 1985 now abandoned.

BACKGROUND OF THE INVENTION

1. Field of the Invention

The present invention relates to an air conditioner. More specifically, the present invention relates to an air conditioner whose operation is controlled based on the comparison of the room temperature with the set temperature.

2. Description of the Prior Art

One example of an air conditioner capable of temperature operation is disclosed, for example, in the Japanese Utility Model application Laid-Open No. 99334/1981 laid open on Aug. 5, 1981. FIG. 9 shows this prior art. In reference to FIG. 9, a voltage divided by a room temperature sensor, namely, a thermistor TH and a temperature setter, namely, a variable resistor VR is applied to an input (−) of a comparator, namely, an operational amplifier OP. A reference voltage determined by a resistor R11 and a resistor R12 is applied to an input (+) of this operational amplifier OP. The operational amplifier OP compares these two inputs and gives the output thereof to a control circuit such as a microcomputer. The control circuit controls the operation of the air conditioner, that is, a compressor in response to an output from the comparator.

In the prior art as shown in FIG. 9, the temperature setting is performed by adjusting the variable resistor VR. However, users sometimes leave the setting intact always to a maximum (or minimum) value without adjusting such a temperature setter, namely, the variable resistor VR each time. In such a case, an excessive heating (or cooling) operation more than required is performed, and it is not preferable in the viewpoint of energy efficiency.

SUMMARY OF THE INVENTION

Therefore, the principal object of the present invention is to provide an air conditioner which can improve the energy efficiency.

Another object of the present invention is to provide an air conditioner which can prevent a heating or cooling operation more than required by placing a limitation on the set temperature.

In brief, the present invention is an air conditioner whose operation is controlled based on the temperature measured by a temperature sensing means and the temperature set by temperature setting means, which further provides switch means and means for placing a limitation on the set temperature by temperature setting means in response to this switch means.

In accordance with the present invention, by operating the switch means, setting to a higher (or lower) temperature than a required value by the temperature setting means can be prevented, and, accordingly an operation over or under capacity can be prevented. Consequently, the air conditioner in accordance with the present invention can perform an efficient operation.

If the switch means is constituted as a manual switch, the supervisor can select whether or not need to restrict the set temperature by the temperature setting means as required, and accordingly always can perform an operation with an optimum capacity.

In a preferred embodiment in accordance with the present invention, the air conditioner comprises a refrigeration system wherein a compressor, an indoor heat exchanger, expansion means and an outdoor heat exchanger are connected in a refrigerant flow relationship and an electric heater is installed associated with the indoor heat exchanger, for example, in the wind path of the indoor heat exchanger. This electric heater is controlled based on the outdoor temperature. If the outdoor temperature is lower than a predetermined temperature, the electric heater is turned on, and also the operation of the compressor is stopped.

In accordance with this preferred embodiment, when the outdoor temperature is high, the normal heating operation is performed by the refrigeration system, and when the outdoor temperature is excessively low, a stable heating operation can be performed by turning on the electric heater irrespective of the change in the outdoor temperature. Also, by stopping the compressor when the electric heater is turned on, the operation in the state where the heating capacity of the refrigeration system is kept reduced can be prevented, and accordingly a wasteful electric power consumption can be prevented.

These objects and other objects, features, aspects and advantages of the present invention will become more apparent from the following detailed description of the embodiments of the present invention when taken in conjunction with accompanying drawings.

DESCRIPTION OF THE PREFERRED EMBODIMENTS

Figure 9:
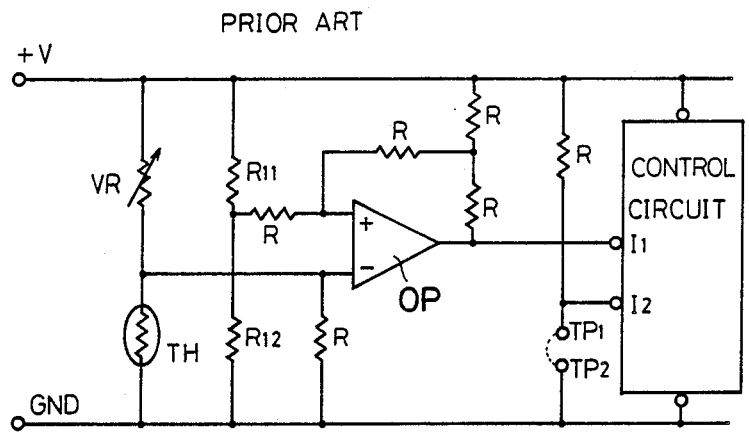
FIG. 9 is a circuit diagram showing a control system of the prior art.
Figure 1:
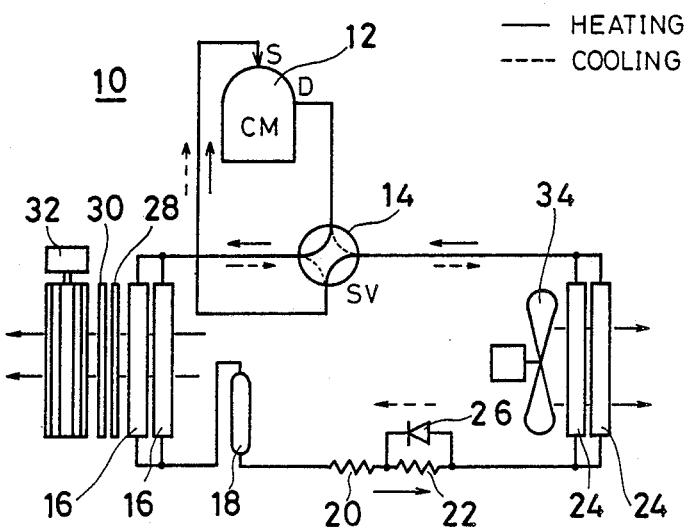
FIG. 1 is a refrigeration system showing one embodiment in accordance with the present invention.

FIG. 1 is a refrigeration system showing one embodiment in accordance with the present invention. In this FIG. 1, a flow of a refrigerant at heating is shown by a solid arrow mark and a flow of the refrigerant at cooling is shown by a dotted arrow.

A refrigeration system 10 comprises a compressor 12, a four-way valve 14, an indoor heat exchanger 16, a reservoir 18, expansion devices 20 and 22 and an outdoor heat exchanger 24 which are connected in a refrigerant flow relationship by suitable refrigerant conduits. A check valve 26 wherethrough a refrigerant flows in the direction of the dotted line only at cooling operation is connected to the expansion device 22. Associated with the indoor heat exchanger 16, a first and a second electric heaters 28 and 30 are installed, and also a cross-flow fan 32 as an indoor blower is installed. Ratings of the first and the second electric heaters 28 and 30 are, for example, 2KW and 3KW, respectively. Associated with the outdoor heat exchanger 24, a propeller fan 34 as an outdoor blower is installed. Meanwhile, the first and second electric heaters 28 and 30 are installed in a wind path of the indoor heat exchanger 16, for example.

When the four-way valve 14 is in a state as shown by the solid line in FIG. 1, the refrigerant discharged from the compressor 12 flows in the direction of the solid arrow, and the indoor heat exchanger 16 and the outdoor hat exchanger 24 act as a condenser and an evaporator, respectively, and thereby a heating operation is performed. At this heating operation, the first and the second electric heaters 28 and 30 are turned on as required.

Also, by changing-over the four-way valve 14 to a state as shown by the dotted line in FIG. 1, the refrigerant discharged from the compressor 12 flows in the direction of the dotted arrow and the indoor heat exchanger 16 and the outdoor heat exchanger 24 act as an evaporator and a condenser respectively, and thereby the cooling operation is performed.

Figure 2:
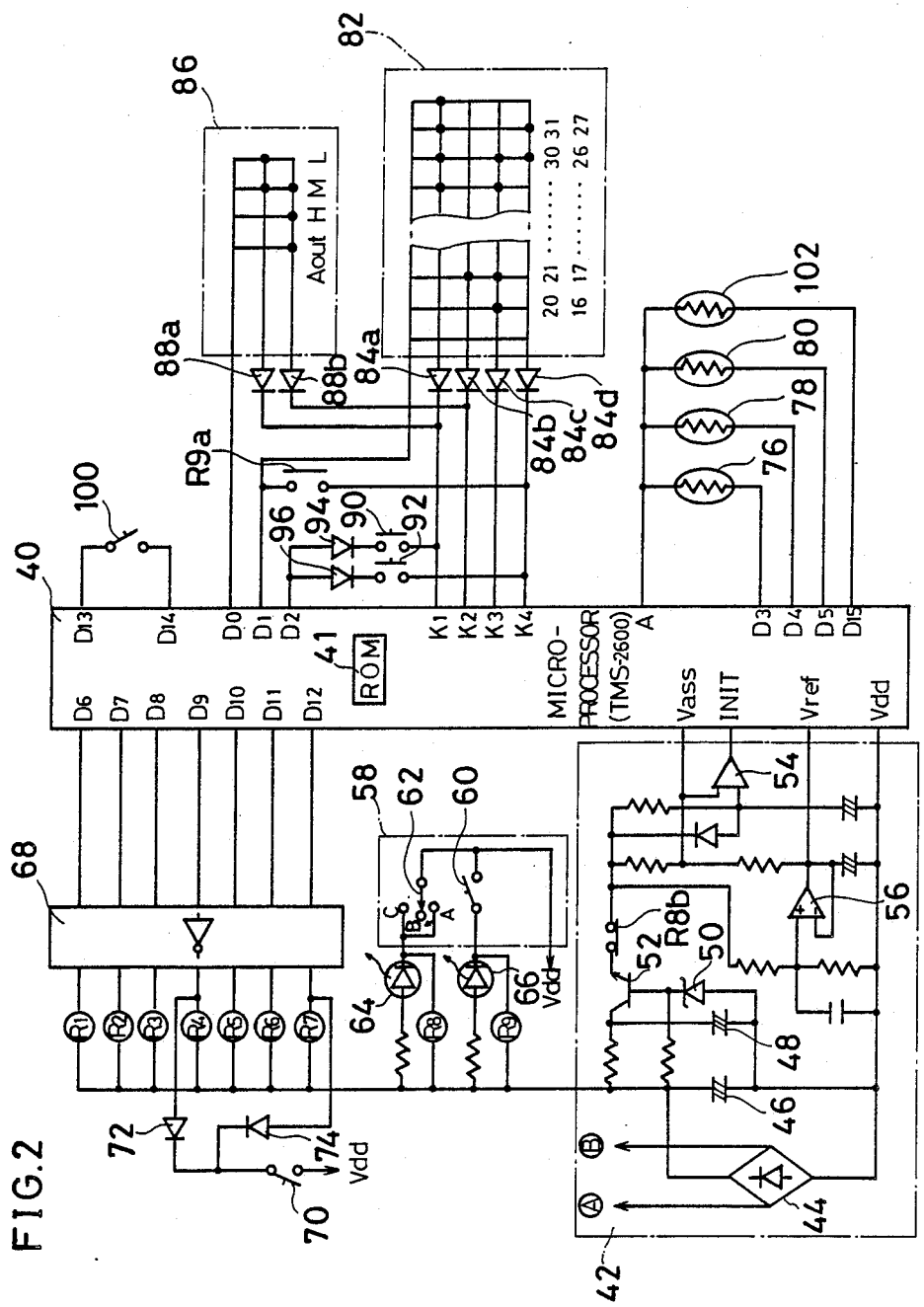
FIG. 2 and FIG. 3 are circuit diagrams showing a control system for controlling a refrigeration system in FIG. 1.
Figure 3:
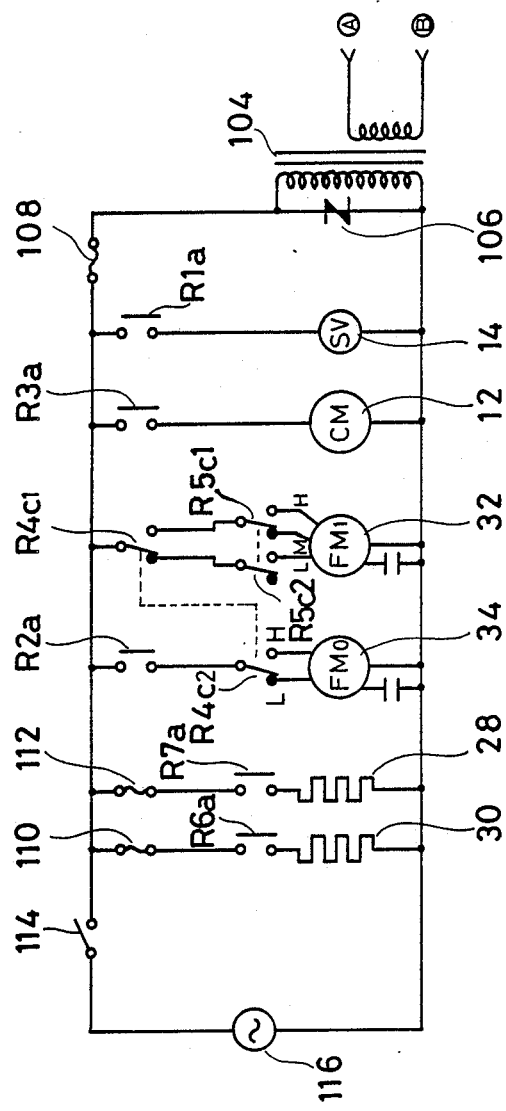

The refrigeration system 10 as shown in FIG. 1 is controlled by a control system as shown in FIG. 2 and FIG. 3. The control system comprises a microprocessor 40, and, for example, the integrated circuit "TMS-2600" made by Tokyo Sanyo Electric Co. can be utilized for this microprocessor 40. Various voltages and signals are applied to the microprocessor 40 from a power source circuit 42.

The power source circuit 42 comprises a rectifying circuit 44 which is connected to a commercial power source 116 (FIG. 3) through a transformer 104 (FIG. 3). An output of this rectifying circuit 44 is smoothed by capacitors 46 and 48, being controlled to a constant voltage by a zener diode 50. The constant DC voltage thus obtained is applied to the base of a power transistor 52. The collector of this transistor 52 is connected to the (+) side of the DC voltage through a resistor, and the emitter is connected to the (−) side through a normally closed contact R8b of a relay R8. Then, a comparator 54 and a buffer 56 are connected to the emitter circuit of this power transistor 52. This comparator 54 gives a reset signal (initializing signal) to a terminal INIT of the microprocessor 40 when the power source is turned on or when the normally closed contact R8b is turned off. The buffer 56 supplies the microprocessor 40 with a reference voltage Vref lower than a voltage Vass. The (−) side of DC voltage is connected to a terminal Vdd of the microprocessor 40.

A remote control unit 58 is installed in the control system, and this remote control unit 58 is installed apart from the main body (not illustrated) of the air conditioner comprising the microprocessor 40. Two switches 60 and 62 are installed in the remote control unit 58, and these switches 60 and 62 are connected to the air conditioner main body by lead wires. However, this remote control unit 58 can be realized also as of a wireless structure.

The switch 60 contained in the remote control unit 58 is utilized to place a limitation on the temperature set by a room temperature setting switch 82 as described later. Also, the switch 62 is for stopping the operation of the air conditioner and has three contacts A, B and C, and the contact B is a neutral contact. When the switch 62 is operated to change-over the contact piece to the contact A and thereafter the manual operation is released, the contact piece returns automatically to the neutral point B. On the other hand, the contact piece can be changed-over between the contact B and the contact C only by the manual operation. For such a switch 62, for example, "Eightswitch" (trade name) made by FUJISOKU CO. can be utilized.

A light emitting diode 64 is connected between the two contacts A and C of the switch 62 in the remote control unit 58 and the (+) side of the DC voltage from the power source circuit 42, and the relay R8 is connected in parallel with this light emitting diode 64. Also, a light emitting diode 66 is connected between the switch 60 and the (+) side, and a relay R9 is connected in parallel with this light emitting diode 66. The relay R8 has one normally open contact R8b (this is contained in the above-described power source circuit 42), and the relay R9 has one normally open contact R9a. Accordingly, when the switch 60 is turned on, the light emitting diode 66 is lighted and also the relay R9 is energized, and the normally open contact R9a thereof is turned on. Also, when the contact piece of the switch 62 is changed-over to the contact A or C, the light emitting diode 64 is lighted and also the relay R8 is energized, and the normally closed contact R8b of this relay R8 is turned off. More specifically, by operating this switch 62, the emitter circuit of the power transistor 52 in the power source circuit 42 is turned off, and accordingly the operation of the microprocessor 40, that is, the operation of the air conditioner is stopped.

To be specific, the switch 62 is operated manually, and the contact piece thereof is brought in contact with the contact A, and thereby the relay R8 is energized to stop the operation, but immediately after that the contact piece returns to the neutral contact B to put the machine in a state of waiting operation However, when the contact piece of this switch 62 is change-over to the contact C, the operation is kept stopped unless the piece is returned manually to the contact B.

Terminals D6 through D12 of the microprocessor 40 are connected to relays R1 through R7 through a buffer amplifier 68, respectively. Accordingly, for example, when a signal "1" is outputted to the terminal D6 of the microprocessor 40, the corresponding relay R1 is energized. Similarly, when the signal "1" is outputted to the terminal D12, the corresponding relay R7 is energized. Respective contacts of these relays R1 through R7 are comprised in the control circuit as shown in FIG. 3.

To be more specific, the relay R1 has one normally open contact R1a, and this contact R1a is utilized for changing-over the four-way valve 14. The relay R2 has one normally open contact R2a, and this contact R2a is connected to the current path of the propeller fan 34. The relay R3 has one normally open contact R3a, and this contact R3a is utilized for turning on or off the compressor 12. The relay R4 has two change-over contacts R4c1 and R4c2, and one change-over contact R4c1 is connected to the current path of the cross-flow fan 32, and the other change-over R4c2 is connected to the current path of the propeller fan 34. Also, the relay R5 has two change-over contacts R5c1 and R5c2, and these two change-over contacts R5c1 and R5c2 are connected to the cross-flow fan 32. That is, the rotating speed, namely, the amount of air flow of the propeller fan 34 associated with the outdoor heat exchanger 24 is changed-over to "L" or "H" by the relay R4, and the amount of air flow or the wind speed of the cross-flow fan 32 associated with the indoor heat exchanger 16 is changed-over to "L", "M" or "H" by the relays R4 and R5. The relays R6 and R7 have one normally open contact R6a and one normally open contact R7a respectively, and the contact R6a is connected to the current path of the second electric heater 30 together with a fuse 110, and the contact R7a is connected to the current path of the first electric heater 28 together with a fuse 112. That is, when the relay R6 is energized, the second electric heater 30 is turned on, and when the relay R7 is energized, the first electric heater 28 is turned on.

An AC voltage from the commercial power source 116 is applied to a respective components in FIG. 3, and this commercial power source 116 is turned on or off by a power switch 114. Meanwhile, in the circuit in FIG. 3, a varistor 106 installed in the primary coil of the transformer 104 is for absorbing a surge voltage, and further a main fuse 108 is comprised in the circuit in FIG. 3.

Now back to FIG. 2, a quick heating switch 70 is connected between the (−) terminal Vdd and the relays R4 and R7 through reverse blocking diodes 72 and 74. When the quick heating switch 70 is turned on, the relays R4 and R7 are energized irrespective of the state of the corresponding terminals D9 and D12 of the microprocessor 40. Accordingly, the cross-flow fan 32 is changed-over to "M" or "H", and the propeller fan 34 is changed-over to "H". At the same time, the contact R7a of the relay R7 is turned on, and the first electric heater 28 is turned on. Thus, by turning on the quick heating switch 70, the quick heating is executed.

Temperature sensors 76, 78, 80 and 102 are connected between the terminals D3, D4, D5 and D15 and the terminal A, respectively. These sensors 76, 78, 80 and 102 are composed of, for example, a thermistor of negative characteristic, respectively. The temperature sensor 76 is for measuring the temperature of a room, the temperature sensor 78 is for measuring the temperature of the indoor heat exchanger 16, the temperature sensor 80 is for measuring the temperature of the outdoor heat exchanger 24, and the temperature sensor 102 is used for measuring the temperature outdoors. The microprocessor 40 gives signals to the terminal D3, D4, D5, and D15 in sequence, and by reading the magnitude of the voltage at the terminal A at that time, the temperatures measured by the respective temperature sensors 76, 78, 80 and 102 can be known.

A temperature setting switch 82 is composed of, for example, slide switches which have points that can be fit into graduation marks, and respective contacts of one side of this switch 82 are connected to the terminal D1 of the microprocessor 40 and respective contacts of the other side are connected to terminals K1 through K4 individually through reverse blocking diodes 84a through 84d. Then, a signal is outputted to the terminal D1 of the microprocessor 40, and the states of the terminals K1 through K4 are scanned with the timing thereof, and thereby a code signal, that is, the data of the set temperature (Ts) responding to the state of the switch 82 at that time is read.

The above-described normally open contact R9a of the relay R9 is connected between the terminal D1 and the terminal K4 of the microprocessor 40 Also, a series circuit composed of an operation/stop switch 90 and a reverse blocking diode 94 is connected between the terminal D2 and the terminal K1, and a series circuit composed of a heat/cool switch 92 and a reverse blocking diode 96 is connected between the terminal D2 and the terminal K4. The microprocessor 40 outputs a signal from the terminal D2, and if the signal is inputted at the terminal K1 at that time, it is decided that the switch 90 has been turned on, and accordingly "Operation" has been commanded. Similarly, when a signal is outputted to the terminal D2, if the signal is inputted from the terminal K4, it is detected that the switch 92 has been turned on, and accordingly "Heat" has been commanded.

A wind speed setting switch 86 is composed of, for example, slide switches, and respective contacts of one side are connected to the terminal D0 of the microprocessor 40 in common, and also respective contacts of the other side are connected to the terminals K1 and K2 individually through reverse blocking diodes 88a and 88b. Accordingly, the microprocessor 40 can know which one of "H", "M" and "L" is set as the wind speed by watching the states of the terminals K1 and K2 when outputting the signal to the terminal D0.

A main switch 100 is connected between terminals D13 and D14 of the microprocessor 40, and this main switch 100 is for putting the air conditioner into the waiting state. Accordingly, operation of the operation/stop switch 90 is enabled only when this main switch 100 is turned on.

Meanwhile, FIG. 2 and FIG. 3 show a state wherein all of the relays R1 through R9 are de-energized.

Figure 4:
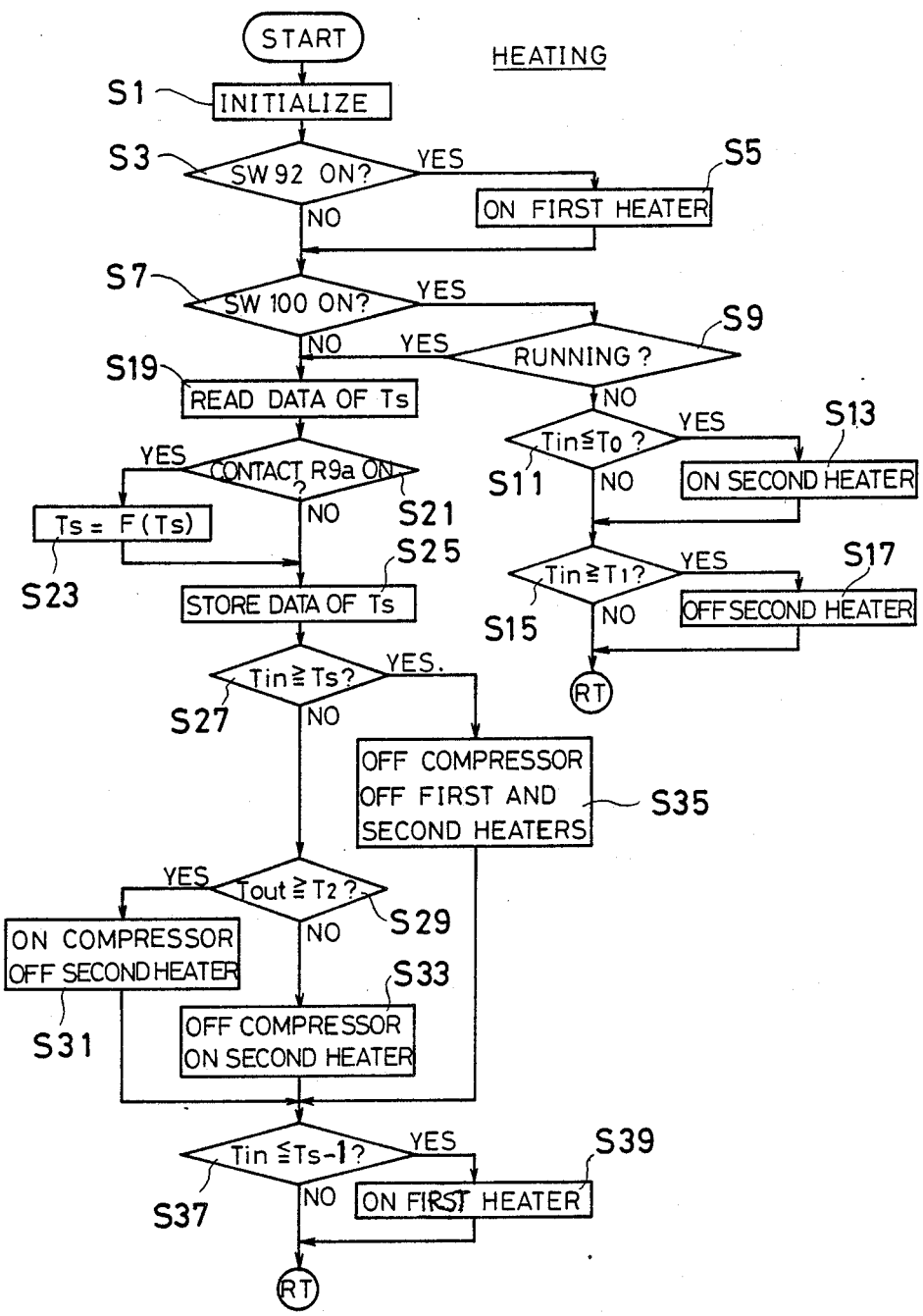
FIG. 4 is a flowchart for explaining operation at heating in this embodiment.

FIG. 4 is a flowchart for explaining operation at heating of the above-described embodiment. The heating operation is set by turning on the switch 92.

In the first step S1, initialization is performed. To be specific, when the power switch 114 (FIG. 3) is turned on, an AC voltage is applied to the rectifying circuit 44 comprised in the power source circuit 42 through the transformer 104. Then, the power transistor 52 is turned on, and since the relay R8 is kept de-energized at this time, a reset signal is outputted to the terminal INIT of the microprocessor 40 from the comparator 54.

In the next step S3, the microprocessor 40 decides whether or not the switch 92 has been depressed in reference to the signal at the terminal K4. That is, in this step S3, the microprocessor 40 decides whether or not the start of the heating operation has been commanded. Then, in this step S3, if it is detected that the switch 92 has been turned on, the microprocessor 40 outputs a signal to the terminal D12 thereof and energizes the relay R7 in the next step S5. Responsively, the normally open contact R7a of this relay R7 is turned on, and energizing of the first electric heater 28 connected thereto is started. The heating power at starting time is improved by this first electric heater 28.

In the following step S7, the microprocessor 40 decides whether or not the main switch 100 has been turned on in reference to the signal at the terminal D14. Then, in the next step S9, the microprocessor 40 decides whether or not the air conditioner is in running. That is, in this step S9, the microprocessor 40 decides whether or not the switch 90 has been turned on in reference to the signal at the terminal K1.

If the main switch 100 has been turned on and no operation is being made, the microprocessor 40 decides whether or not "Tin≦To" holds in the following step S11. That is, in this step S11, the microprocessor 40 decides whether or not a room temperature Tin measured by he room temperature sensor 76 is lower than a first predetermined temperature To, for example, 3.5° C. Then, if the room temperature is lower than 3.5° C., the microprocessor 40 outputs a signal to the terminal D11 and energizes the relay R6 in the next step S13.

Responsively, in this step S13, the normally open contact R6a of the relay R6 is turned on and energizing of the second electric heater 30 is started. Then, in the step S15, the microprocessor 40 decides whether or not "Tin ≧T1" holds. That is, in this step S15, the microprocessor 40 decides whether or not the room temperature Tin exceeds a second predetermined temperature T1, for example 5.5° C. If "YES" is decided in the step S15, the microprocessor 40 releases the signal at the terminal D11 to de-energize the relay R6. Accordingly, in the step S17, the second electric heater 30 is turned off. Thus, the second electric heater 30 is energized when the room temperature Tin is lower than the first predetermined temperature To, and the energizing is released when the second predetermined temperature T1 is reached, and accordingly the second electric heater 30 acts as a further auxiliary heater for improving the heating power at starting time.

Meanwhile, the values of the first and the second predetermined temperatures To and T1 in the steps S11 and S15 are not limited to 3.5° C. and 5.5° C. respectively, but has only to be set arbitrarily so as to meet the use conditions. However, at this time, an appropriate differential width is required to be set for "Ti>To". Then, such data, together with data of a third predetermined temperature T2 as described later and conversion tables (FIG. 5 and FIG. 7), are to be set in advance in a ROM 41 comprised in the microprocessor 40.

Figures 5, 6:
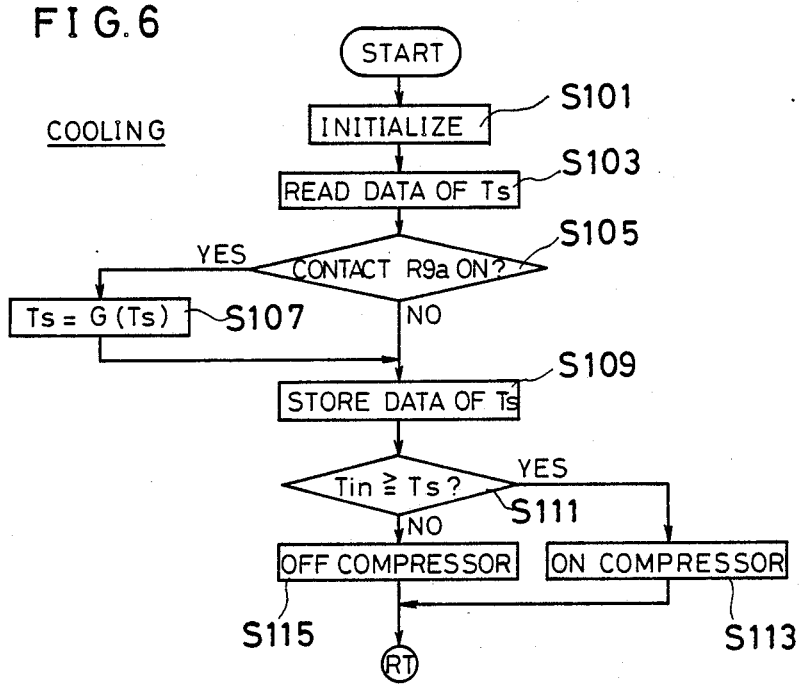
FIG. 5 is a conversion table showing one example of relation between a set temperature Ts and a set temperature after limitation F(Ts).
FIG. 6 is a flowchart for explaining operation at cooling in this embodiment.

When the main switch 100 is turned off in the previous step S7, or when it is set to "operation" in the step S9, the microprocessor 40 reads data of the set temperature Ts set by the room temperature setting switch 82 in reference to the signals at the terminals K1 through K4 in the following step S19. Then, in the next step S21, the microprocessor 40 decides whether or not the relay contact R9a has been turned on in reference to the signal at the terminal K4. For example, when the switch 60 comprised in the remote control unit 58 is turned on, the relay R9 is energized and the normally open contact R9a thereof is turned on. That is, in the step S21, the microprocessor 40 decides whether or not the switch 60 comprised in the remote control unit 58 for placing a limitation on the set temperature has been turned on. If "YES" is decided in this step S21, the microprocessor 40 converts the set temperature Ts into another temperature F(Ts) in reference to the conversion table as shown in FIG. 5 in the next step S23.

To be more specific in response to the operation of the room temperature setting switch 82, for example, temperature data (code signal) ranging from 16° C. to 27° C. are inputted to the terminals K1 through K4. Then, when the contact R9a is turned on, the microprocessor 40 processes code signals given to these terminals K1 through K4 as an address to read data F (Ts) of that address of the conversion table comprised in the ROM 41. Thus, if a limitation of the set temperature has been commanded by operating the switch 60, the microprocessor 40 performs a data conversion of "Ts=F(Ts)" in the stp S23. Accordingly, even when, for example, a temperature 27° C. has been set by the slide switch 82, if the switch 60 has been operated, for example, a temperature 24° C. is read for the set temperature F(Ts), and even when, for example a temperature 16° C. has been set, for example, a temperature 19° C. is read. In other words, if the switch 60 is operated at heating, the microprocessor 40 places a limitation on the upper limit of the set temperature being set by the room temperature setting switch 82.

Thus, when "NO" is decided in the step S21, the data of the set temperature Ts is stored intact, and when "YES" is decided in the step S21, the set temperature data F(Ts) converted in the step S23 is stored in a working register or RAM (not illustrated) in the step S25.

Thereafter, in the step S27, the microprocessor 40 decides whether or not "Tin ≧Ts" holds. To be specific, in this step S27, the microprocessor 40 decides whether or not the room temperature Tin measured by the room temperature sensor 76 is higher than the set temperature Ts or F(Ts) picked up in the step S25. Then, when the room temperature is lower than the set temperature, the microprocessor 40, in the next step S29, decides whether or not an outdoor temperature Tout measured by the temperature sensor 102 is higher than the third predetermined temperature T2, for example, 1.67° C. Meanwhile, the third predetermined temperature T2 is also stored in advance in the ROM 41 comprised in the microprocessor 40.

When "YES" is decided in the step S29, that is, when the outdoor temperature Tout is higher than the third predetermined temperature T2, the microprocessor 40 continues to output the signal to the terminal D8, and thereby the turn-on state of the compressor 12 is continued. At the same time, the microprocessor 40 turns off the signal at the terminal D11, keeps the relay R6 in the de-energized state, and turns off the second electric heater 30. That is, when the outdoor temperature is higher than the third predetermined temperature, the normal heating operation by means of the refrigeration system 10, (FIG. 1) and the first electric heater 28 is performed.

When the outdoor temperature Tout is lower than the third predetermined temperature T2, for example, 1.67° C., the microprocessor 40 releases the signal at the terminal D8 and outputs the signal to the terminal D111 in the step S33. Responsively, in this step S33, the compressor 12 is turned off, and the second electric heater 30 is turned on. Accordingly, in this state, the refrigeration system 10 is stopped to be operated, and the heating operation is performed only by the two electric heaters 28 and 30. This is performed for the following reason. When the outdoor temperature Tout is excessively low, the heating by the refrigeration system 10 does not work up to capacity, and therefore the operation becomes very inefficient. Then, in the present embodiment, such an inefficient operation is not performed, but the heating operation is performed only by the electric heaters, and thereby a wasteful electric power consumption is prevented.

In the previous step S27, when it is decided that the room temperature Tin has exceeded the set temperature Ts or F(Ts), the microprocessor 40, in the step S35, releases all of the signals of the terminals D8, D11 and D12, and turns off the compressor 12 and also turns off the first and the second electric heaters 28 and 30, stopping the heating operation.

After going through the step S31, S33 or S35, the microprocessor 40 decides whether or not "Tin <Ts −1" holds in the step S37. More specifically, in the step S37, the microprocessor 40 decides whether or not the room temperature Tin has become 1° C. lower than the set temperature Ts or F(Ts). When a fall of 1° C. is detected, the microprocessor 40 outputs the signal to the terminal D12 to turn on the first electric heater 28 in the following step S39. Thus, the first electric heater 28 is controlled with such a differential that it is turned on when the room temperature Tin becomes 1° C. lower than the set temperature Ts or F(Ts), and thereafter turned off if "Tin≧Ts" holds.

Meanwhile, to prevent chattering caused by ON/OFF of the compressor 12, such a differential may be set to a temperature at which the compressor 12 is turned on or off.

FIG. 6 is a flowchart for explaining operation at cooling. At the cooling operation, a signal is outputted to the terminal D6 of the microprocessor 40, and the relay R1 is energized to change-over the four-way valve 14 to the state reverse to that at heating operation.

In the first step S101, initialization is performed likewise the previous step S1. Then, in the step S103, the microprocessor 40 reads data of the set temperature Ts set by the room temperature setting switch 82 in reference to the terminals K1 through K4. In the next step S105, the microprocessor 40 decides whether or not the normally open contact R9a of the relay R9 has been turned on, that is, whether or not the switch 60 of the remote control unit 58 has been turned on to command a limitation of the set temperature likewise the previous step S21.

Figures 7, 8:
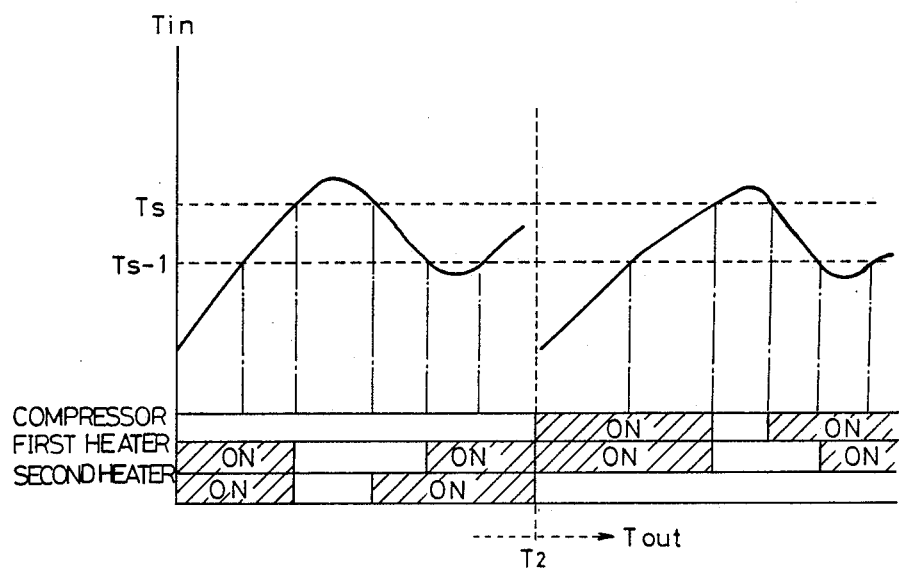
FIG. 7 is a conversion table showing one example of relation between the set temperature Ts and a set temperature after limitation G(Ts).
FIG. 8 is an explanatory view showing operational states of a compressor and a first and a second electric heaters.

Then, if this relay contact R9a has been turned on, the microprocessor 40, in the next step S107, converts the set temperature Ts into another temperature G(Ts) in reference to the conversion table as shown in FIG. 7 which is stored in advance in the ROM 41 likewise the previous step S23 (FIG. 4). Accordingly, when this step S107 is executed, if, for example, a temperature 20° C. has been set by the room temperature switch 82, it is converted into, for example, a temperature 23° C., and if, for example, a temperature 31° C. has been set, it is converted into, for example, a temperature 28° C. In other words, if the switch 60 is operated at cooling, the microprocessor 40 places a limitation on the lower limit of the set temperature being set by the room temperature setting switch 82.

The set temperature data Ts or G(Ts) thus obtained is read in the step S109. That is, if the relay contact R9a has been turned on, the temperature data G(Ts) after converted by "Ts=G(Ts)" is stored, or if the relay contact R9a has been turned off, the temperature data Ts set by the switch 82 is stored intact in the working register or the RAM. Thereafter, such a temperature data Ts or G(Ts) is compared with the room temperature Tin to control the cooling operation.

In the step S111, the microprocessor 40 compares the data of the room temperature Tin detected by the room temperature sensor 76 with the data of the set temperature Ts or G(Ts) stored in the previous step S109. Then, if "YES" is decided in this step S111, the microprocessor 40 continues to output the signal to the terminal D8, and turns on the compressor 12, continuing the cooling operation. In reverse, if the room temperature falls below the set temperature, the microprocessor 40 turns off the compressor 12 in the step S115.

Meanwhile, such a differential as in the previous step S37 (FIG. 4) may be set to the temperatures of ON/OFF of the compressor 12 in the steps S113 and S115 to prevent chattering of the compressor 12.

Summarized description is made on the above-described heating operation in reference to FIG. 8. When the outdoor temperature Tout is lower than the third predetermined temperature T2, for example, 1.67° C., the compressor 12 is stopped to operate, and the heating operation by the first and the second electric heaters 28 and 30 only is performed. Thereafter, the room temperature Tin rises with "Tout≧T2" remaining intact, and when that temperature exceeds the set temperature Ts or F(Ts), the first and the second electric heaters are turned off. Thereafter, the heating operation is performed only by ON/OFF of the first and the second electric heaters 28 and 30 until the outdoor temperature exceeds the third predetermined temperature T2. Thus, when the outdoor temperature is low and a sufficient heat pump operation by means of refrigeration cycle cannot be maintained, the operation of the refrigeration system 10 is stopped in view of the energy efficiency.

When the outdoor temperature is high, the efficiency of the refrigeration system 10 is not poor, and therefore the normal heating operation by means of the refrigeration system 10 and the first electric heater 28 is performed.

Also, if the room temperature falls attending on a fall in the outdoor temperature when the air conditioner is not operated and "Tin≦To" holds and the main switch 100 is turned on, the second electric heater 30 is turned on automatically likewise in the steps S11–S15 (FIG. 4). Thereby, freezing of an indoor water pipe and a door due to a fall in the room temperature can be prevented.

As described above, for example, at the heating operation, the set temperature range is changed from "16≦Ts≦27" to "19≦Ts≦24" by the switch 60 of the remote control unit 58 which is installed apart from the main body of the air conditioner. Thereby, a heating operation which does not cause an over heating or an under heating can be performed.

Here, description is made on the case where the switch 62 comprised in the remote control unit 58 is operated. When the switch 62 is operated and the contact piece thereof is changed-over to the contact A, the relay R8 is energized and the normally closed contact R8b is turned off. When this contact R8b is turned off, the reset signal is outputted from the resetting means, namely, the comparator 54, and responsively, the microprocessor 40 is reset. Accordingly, in accordance with the present embodiment, by operating either of the switch 90 installed in the air conditioner main body and the switch 62 installed in the remote control unit 58, the microprocessor 40 is reset, and the operation of the air conditioner is stopped. Thus, it is very convenient if the operation of the air conditioner can be stopped also by the switch installed in the remote operating unit. To be specific, in the case where such an air conditioner is installed particularly in a hotel or the like, the operation of the air conditioner can be stopped forcibly from the other place, by the switch 62 of the remote control unit 58 even when a guest goes out without turning off the switch 90 of the main body side, and therefore continuation of a wasteful operation can be prevented effectively.

Furthermore, for defrosting operation at the heating operation such a general method is employed that defrosting is started when the temperature of the outdoor heat exchanger 24 is detected by the temperature sensor 80 and the change in temperature of this exchanger 24 becomes a predetermined condition. Also, for preventing a blow-out of cool air after completing defrosting, such a general method is employed that the temperature of the indoor heat exchanger 16 is measured by the temperature sensor 78 and the cross-flow fan 32 is stopped for a predetermined period of time.

Meanwhile, it is as described above that the states of the cross-flow fan 32 and the propeller fan 34 are controlled by the wind speed setting switch 86 and the relays R4 and R5.

In the above-described embodiment, to set limits to the set temperature, the manual switch 60 and the relay R9 responding thereto are used. However, this may be performed in a manner that whether or not need to place a limitation on the set temperature is instructed automatically on a season basis using, for example, a yearlong timer.

In addition, specific values of the first, the second and the third predetermined temperature T0, T1 and T2 in the above-described description, needless to say, can be set arbitrarilly depending upon the performance of the refrigeration system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An air conditioner with an energy saving switch, comprising:
    a refrigerating system including compressor means, indoor heat exchanger means, expansion means and outdoor heat exchanger means connected in refrigerant flow relationship,
    means for measuring a temperature of a room in which said indoor heat exchanger means is located to produce measured temperature data of the temperature of the room,
    means for defining a temperature range from a first temperature to a second temperature which is higher than the first temperature so that a temperature to be produced by said refrigerating system can be set in said temperature range,
    means for setting a temperature within said temperature range, which includes means generating set temperature data of the set temperature,
    means for controlling an operation of said refrigerating system based on a comparison between the set temperature data generated by said means for generating temperature data and the measured temperature data produce by said temperature measuring means,
    switch means,
    means for changing said set temperature data in response to an operation of said switch means, said changing means including at least one of means for forcibly changing said set temperature data of the set temperature into temperature data corresponding to a third temperature only if the temperature set within said temperature range is within a first temperature subrange which exits between the third temperature and the second temperature when said refrigerating system is set in a heating mode and means for forcibly changing said temperature data of the set temperature into temperature data corresponding to a fourth temperature only if the temperature set within said temperature range is within a second temperature subrange which exists between the first temperature and the fourth temperature when said refrigerating system is set in a cooling mode,
    said means for controlling including at least one of means for controlling an operation of said refrigerating system based on a comparison between said third temperature data and the measured temperature data produced by said temperature measuring means if the temperature set by said setting means is within said first temperature subrange in said heating mode and means for controlling an operation of said refrigerating system based on a comparison between said fourth temperature data and the measured temperature data produced by said temperature measuring means is the temperature set by said setting means is within said second temperature substrate in said cooling mode.

2. An air conditioner in accordance with claim 1, wherein said switch means includes a manual switch.

3. An air conditioner in accordance with claim 1, wherein said means for controlling further comprises:
    first operational switch means installed in a main unit of said refrigerating system for commanding operation or stopping of said refrigerating system,
    second operational switch means installed in a remote control unit apart from said main unit of said refrigerating system for stopping operation of said refrigerating system, and
    means for stopping operation of said refrigerating system in response to an operation of either of said first or said second operational switch means.

4. An air conditioner in accordance with claim 2, further comprising a remote control unit for remotely controlling said refrigerating system, wherein said manual switch is provided in said remote control unit.

5. An air conditioner in accordance with claim 4, wherein said remote control unit is provided in a room separated from said room in which said indoor heat exchanger is provided.

6. An air conditioner in accordance with claim 1, wherein said means for defining the temperature range includes means for storing a set of data of said temperature range and said means for changing the temperature range includes means for storing another set of data of another temperature range, and when the switch means is operated a microprocessor forcedly modifies the set temperature data to a temperature within said another set of the temperature data of said another temperature range.

7. An air conditioner in accordance with claim 6, wherein is temperature range changing means is formed to change the temperature range is which said temperature data is generated by said set temperature data generating means.

8. An air conditioner in accordance with claim 6, wherein said temperature range changing means includes means for producing another temperature data based on the temperature data set by said temperature setting means so as to change the temperature range in which said another temperature data is generated by said set temperature data generating means.

9. An air conditioner with an energy saving switch, comprising
    a refrigerating system including compressor means, indoor heat exchanger means, expansion means and outdoor heat exchanger means connected in refrigerant flow relationship,
    means for measuring a temperature of a room in which said indoor heat exchanger means is located to produce measured temperature data of the temperature of the room,
    means for defining a temperature range in which a temperature to be produced by said refrigerating system can be set, means for setting a temperature within said temperature range, which includes means for generating set temperature data of the set temperature, means for controlling an operation of said refrigerating system based on a comparison between the set temperature data generated by said means for generating temperature data and the measured temperature data produced by said temperature measuring means, switch means, and means for changing said set temperature data in response to an operation of said switch means, said changing means including at least one of means for lowering an upper limit of said temperature range when said refrigerating system is set in a heating mode and means for raising a lower limit of said temperature range when said refrigerating system is set in a cooling mode, said means for changing the temperature range including at least one of means for raising the lower limit of the temperature range when said refrigerating system is set in the heating mode and means for lowering the upper limit of the temperature range when said refrigerating system is set in the cooling mode.

10. An air conditioner with an energy saving switch, comprising:

a refrigerating system including compressor means, indoor heat exchanger means, expansion means and outdoor heat exchanger means connected inrefrigerant flow relationship, means for measuring a temperature of a room in which said indoor heat exchanger means is located to produce first digital temperature data representing the temperature of the room, means for setting a temperature to be produced by said refrigerating system to produce second digital temperature data representing the temperature set by a user, said second digital temperature data being included within a temperature range from a first temperature to a second temperature which is higher than the first temperature, switch means, means for changing said second digital temperature data in response to an operation of said switch means, said changing means including at least one of means for changing said second digital temperature data to third digital temperature data corresponding to a third temperature only if the temperature set by said setting means is within a first temperature subrange that exists between third temperature and the second temperature when said refrigerating system is set in a heating mode and means for changing said second digital temperature data to fourth digital temperature data corresponding to a fourth temperature only if the temperature set by said setting means is within a second temperature subrange that exists between the first temperature and the fourth temperature when said refrigerating system is set in a cooling mode, and means for controlling an operation of said refrigerating system based on a comparison between said first digital temperature data and at least one of said third digital temperature data and said fourth digital temperature data.

11. An air controller with an energy saving switch, comprising:

a refrigerating system including compressor means, indoor heat exchanger means, expansion means and outdoor heat exchanger means connected in refrigerant flow relationship, means for measuring a temperature of a room in which said indoor heat exchanger means is located to produce first digital temperature data representing the temperature of the room, means for setting a temperature to be produced by said refrigerating system to produce second digital temperature data representing the temperature set by a user, said second digital temperature data being included within a temperature range from a first temperature to a second temperature which is higher than the first temperature, switch means, means for changing said second digital temperature data in response to an operation of said switch means, said changing means including at least one of means for changing said second digital temperature data to third digital temperature data corresponding to a third temperature only if the temperature set by said setting means is within a first temperature subrange that exists between third temperature and the second temperature when said refrigerating system is set in a heating mode and means for changing said second digital temperature data to fourth digital temperature data corresponding to a fourth temperature only if the temperature set by said setting means is within a second temperature subrange that exists between the first temperature and the fourth temperature when said refrigerating system is set in a cooling mode, and means for controlling an operation of said refrigerating system based on a comparison between said first digital temperature data and at least one of said third digital temperature data and said fourth digital temperature data.

said means for changing including table means by which a change is made, said table means digitally storing temperature data of a plurality of said third digital temperature data so as to respectively correspond to respective one of a plurality of said second digital temperature data.

12. An air conditioner in accordance with claim 11, wherein said means for setting a temperature includes a manual switch which generates a code signal representative of the temperature to be produced by said refrigerating system.

13. An air conditioner in accordance with claim 12, wherein said means for changing includes a ROM in which said third digital temperature data is stored and which is addressed by a code signal from said manual switch.

14. An air conditioner with energy saving switch, comprising:

a refrigerating system including compressor means, indoor heat exchanger means, expansion means and outdoor heat exchanger means connected in refrigerant flow relationship, means for measuring a temperature of a room in which said indoor heat exchanger mean sis located to produce temperature data of the temperature of the room, means for setting a temperature at which said refrigerating system is to be operated, said setting means including a pointer capable of being fit to a graduation mark defined within a first range from a first graduation mark indicating a first temperature to a second graduation mark indicating a second temperature that is higher than the first temperature, means for generating temperature data corresponding to a graduation mark being pointed by said pointer, means for controlling an operation of said refrigerating system based on a comparison between the set temperature data generated by said means for generating temperature data and the measured temperature data produced by said temperature measuring means, switch means, and means for changing said temperature data corresponding to the set temperature in response to an operation of said switch means, said changing means including at least one of means for changing said temperature data corresponding to the set temperature into temperature data corresponding to a third temperature only in response to said pointer being fit to a graduation mark indicating a temperature within a second range between a third graduation mark, which indicates that said third temperature is lower than said second temperature and higher than said first temperature, and said second graduation mark when said refrigerating system is set in a heating mode and means for changing said temperature data corresponding to the set temperature into temperature data of a fourth temperature only in response to said pointer being fit to a graduation mark indicating that said fourth temperature is within a third range between said first graduation mark and a fourth graduation mark when said refrigerating system is set in a cooling mode.

15. An air conditioner with an energy saving switch, comprising:

a refrigerating system including compressor means, indoor heat exchanger means, expansion means and outdoor heat exchanger means connected in refrigerant flow relationship, means for measuring a temperature of a room in which said indoor heat exchanger means is located to produce a digital temperature data of the temperature of the room, means for setting a temperature at which said refrigerating is to be operated, said setting means including a pointer capable of being fit to a graduation mark defined within a first range from a first graduation mark indicating a first temperature to a second graduation mark indicating a second temperature that is higher than the first temperature, means for generating digital temperature data corresponding to a graduation mark being pointed by said pointer, means for controlling an operation of said refrigerating system based on a comparison between the set digital temperature data generated by said means for generating temperature data with the measured digital temperature data produced by said temperature measuring means, switch means, and means for changing said set digital temperature data in response to an operation of said switch means, said changing means including at least one of means for changing said set digital temperature data into digital temperature data corresponding to a third temperature only if said pointer is fit to a graduation mark indicating a temperature within a second range between a third graduation mark, which indicates said third temperature is lower than said second temperature and higher than said first temperature, and said second graduation mark when said refrigerating system is set in a heating mode and means for changing said set digital temperature data into digital temperature data corresponding to a fourth temperature only if said pointer is fit to a graduation mark indicating that said fourth temperature is within a third range between said first graduation mark and a fourth graduation mark when said refrigerating system is set in a cooling mode.

16. An air conditioner with an energy saving switch, comprising:

means for refrigerating air and delivering the air to a room to be conditioned, means for measuring a temperature of said room to produce measured temperature data;

means for setting a temperature within a temperature range at which said refrigerating means is to be operated, said setting means producing set temperature data, said temperature range including two end subranges and a middle subrange between said two end subranges;

means for controlling an operation of said refrigerating means in response to said setting means and said measuring means;

switch means; and means for changing only said set temperature data corresponding to a temperature set in at least one of said end subranges to temperature data corresponding to another temperature within the other subranges in response to an operation of said switch means, said controlling means being response to said changing means to operate said refrigerating means based on a comparison between said measured temperature data and said temperature data corresponding to said another temperature as changed by said change means, said another temperature remaining fixed irrespective of the operation state of said switch means.

* * * * *